(12) United States Patent
DeCusatis

(10) Patent No.: US 8,960,913 B2
(45) Date of Patent: Feb. 24, 2015

(54) THREE DIMENSIONAL IMAGE PROJECTOR WITH TWO COLOR IMAGING

(75) Inventor: Casimer M. DeCusatis, Poughkeepsie, NY (US)

(73) Assignee: International Busniess Machines Corporation, Armonk, NY (US)

( * ) Notice: Subject to any disclaimer, the term of this patent is extended or adjusted under 35 U.S.C. 154(b) by 73 days.

(21) Appl. No.: 13/357,704

(22) Filed: Jan. 25, 2012

(65) Prior Publication Data

US 2013/0188147 A1 Jul. 25, 2013

(51) Int. Cl.
*G03B 21/14* (2006.01)

(52) U.S. Cl.
USPC ............ 353/20; 353/30; 353/31; 353/94; 353/99; 349/5; 349/9

(58) Field of Classification Search
USPC .......... 353/20, 30, 31, 33, 34, 85, 94, 98, 99; 359/487.01, 487.04, 489.01, 489.07, 359/489.09; 362/19, 231, 551, 555, 583; 349/5, 7–9
See application file for complete search history.

(56) References Cited

U.S. PATENT DOCUMENTS

| | | | |
|---|---|---|---|
| 4,630,097 A | 12/1986 | Marks | |
| 4,870,486 A | 9/1989 | Nakagawa et al. | |
| 5,113,285 A | 5/1992 | Franklin et al. | |
| 5,142,366 A | 8/1992 | Brown et al. | |
| 5,168,199 A | 12/1992 | Huffman et al. | |
| 5,420,484 A | 5/1995 | Morrish | |
| 5,751,479 A | 5/1998 | Hamagishi et al. | |
| 6,040,946 A | 3/2000 | Hebert | |
| 6,327,093 B1 | 12/2001 | Nakanishi et al. | |
| 6,344,927 B1 * | 2/2002 | Itoh et al. | 359/485.02 |
| 6,359,664 B1 | 3/2002 | Faris | |
| 6,672,722 B2 | 1/2004 | O'Connor et al. | |
| 6,704,065 B1 * | 3/2004 | Sharp et al. | 349/5 |
| 6,813,085 B2 | 11/2004 | Richards | |
| 7,081,997 B2 | 7/2006 | Sedlmayr | |
| 7,119,957 B2 | 10/2006 | Itoh et al. | |
| 7,270,428 B2 | 9/2007 | Alasaarela et al. | |
| 7,283,308 B2 | 10/2007 | Cossairt et al. | |
| 7,401,923 B2 | 7/2008 | Fergason | |
| 7,446,733 B1 | 11/2008 | Hirimai | |
| 7,468,844 B2 | 12/2008 | Hall, Jr. | |

(Continued)

FOREIGN PATENT DOCUMENTS

| | | |
|---|---|---|
| CN | 1624525 A | 6/2005 |
| CN | 1666269 A | 9/2005 |

(Continued)

OTHER PUBLICATIONS

Chen et al.; "Simple Multimode Stereoscopic Liquid Crystal Display"; Japanese Journal of Applied Physics; Part 2 (Letters); vol. 36; No. 12B; pp. L1685-8; Dec. 15, 1997.

(Continued)

*Primary Examiner* — Sultan Chowdhury
(74) *Attorney, Agent, or Firm* — Cantor Colburn LLP; Steven Chiu

(57) ABSTRACT

A system is provided for projecting a three-dimensional image. The system includes a first light source, emitting a light of a first color and a second light source emitting light of a second color. At least one polarizing beam splitter (PBS) is disposed adjacent the first light and the second light source, and at least one imaging device is disposed adjacent the at least one PBS.

16 Claims, 4 Drawing Sheets

(56) References Cited

U.S. PATENT DOCUMENTS

| | | | |
|---|---|---|---|
| 7,477,220 B2 | 1/2009 | Muto | |
| 7,561,322 B1 | 7/2009 | Maeda et al. | |
| 7,649,915 B2 | 1/2010 | Fermann et al. | |
| 7,692,605 B2 | 4/2010 | Tsao | |
| 7,766,490 B2 | 8/2010 | Harbers et al. | |
| 7,773,160 B2 | 8/2010 | Yamazaki et al. | |
| 7,848,370 B2 | 12/2010 | Kewitsch et al. | |
| 8,337,020 B2 * | 12/2012 | Handschy et al. | 353/20 |
| 8,388,138 B1 * | 3/2013 | Boothroyd | 353/7 |
| 2002/0191235 A1 * | 12/2002 | O'Connor et al. | 359/9 |
| 2003/0179791 A1 | 9/2003 | Hiroshi et al. | |
| 2004/0109329 A1 * | 6/2004 | Kato | 362/555 |
| 2004/0155207 A1 | 8/2004 | Kleinschmidt | |
| 2004/0201879 A1 | 10/2004 | Shih et al. | |
| 2004/0207879 A1 | 10/2004 | Bailey et al. | |
| 2006/0187393 A1 | 8/2006 | Kuan et al. | |
| 2006/0232845 A1 | 10/2006 | Harned et al. | |
| 2006/0238716 A1 | 10/2006 | Lee et al. | |
| 2006/0279662 A1 | 12/2006 | Kapellner et al. | |
| 2006/0290889 A1 | 12/2006 | Robinson et al. | |
| 2007/0035830 A1 | 2/2007 | Matveev et al. | |
| 2007/0115230 A1 | 5/2007 | Tajiri et al. | |
| 2007/0139519 A1 | 6/2007 | DeCusatis et al. | |
| 2007/0139618 A1 | 6/2007 | DeCusatis et al. | |
| 2007/0139769 A1 | 6/2007 | DeCusatis et al. | |
| 2007/0146880 A1 | 6/2007 | Bleha et al. | |
| 2007/0181834 A1 | 8/2007 | Kleinschmidt | |
| 2007/0188863 A1 | 8/2007 | Sun et al. | |
| 2007/0195408 A1 | 8/2007 | Divelbiss et al. | |
| 2008/0018999 A1 * | 1/2008 | Schuck et al. | 359/495 |
| 2008/0043295 A1 | 2/2008 | Sakakibara | |
| 2008/0055550 A1 | 3/2008 | Kim | |
| 2008/0094577 A1 * | 4/2008 | Krijn et al. | 353/20 |
| 2008/0151193 A1 | 6/2008 | Reder | |
| 2009/0040463 A1 * | 2/2009 | Chen et al. | 353/20 |
| 2009/0086016 A1 | 4/2009 | Su | |
| 2009/0141242 A1 | 6/2009 | Silverstein et al. | |
| 2009/0180181 A1 | 7/2009 | Oakley | |
| 2009/0207379 A1 | 8/2009 | Oakley | |
| 2009/0231549 A1 * | 9/2009 | Chen et al. | 353/20 |
| 2009/0310042 A1 * | 12/2009 | Vidal et al. | 349/8 |
| 2010/0039624 A1 | 2/2010 | Fujinawa et al. | |
| 2010/0045938 A1 | 2/2010 | Lin et al. | |
| 2010/0110386 A1 | 5/2010 | Handschy et al. | |
| 2010/0118276 A1 * | 5/2010 | Li | 353/33 |
| 2010/0141856 A1 | 6/2010 | Schuck et al. | |
| 2010/0171909 A1 | 7/2010 | Handschy | |
| 2010/0189344 A1 | 7/2010 | Maes | |
| 2010/0208210 A1 * | 8/2010 | Aastuen et al. | 353/20 |
| 2010/0238413 A1 | 9/2010 | Huang | |
| 2010/0253769 A1 | 10/2010 | Coppeta et al. | |
| 2010/0272138 A1 | 10/2010 | Chiba et al. | |
| 2011/0089315 A1 | 4/2011 | Walt et al. | |
| 2011/0116051 A1 | 5/2011 | Young et al. | |
| 2011/0149253 A1 | 6/2011 | Mihashi et al. | |
| 2011/0204793 A1 | 8/2011 | Gardner, Jr. | |
| 2011/0211168 A1 | 9/2011 | Kim et al. | |
| 2011/0273539 A1 | 11/2011 | Yoon et al. | |
| 2012/0019529 A1 | 1/2012 | Kimpe et al. | |
| 2012/0287144 A1 | 11/2012 | Gandhi et al. | |
| 2012/0307211 A1 | 12/2012 | Hofmann et al. | |
| 2013/0077283 A1 | 3/2013 | Li | |
| 2013/0082994 A1 | 4/2013 | Al-Dahle | |
| 2013/0147393 A1 | 6/2013 | Bazzani et al. | |

FOREIGN PATENT DOCUMENTS

| | | | |
|---|---|---|---|
| CN | 1721961 | A | 1/2006 |
| CN | 1854810 | A | 11/2006 |
| CN | 1885096 | A | 12/2006 |
| CN | 1987552 | A | 6/2007 |
| CN | 101196615 | A | 6/2008 |
| CN | 101364037 | A | 2/2009 |
| CN | 101373054 | A | 2/2009 |
| CN | 101482665 | A | 7/2009 |
| CN | 101571631 | A | 11/2009 |
| CN | 101625467 | A | 1/2010 |
| CN | 101770150 | A | 7/2010 |
| CN | 201576164 | U | 9/2010 |
| CN | 102043254 | A | 5/2011 |
| CN | 102089701 | A | 6/2011 |
| CN | 102193239 | A | 9/2011 |
| CN | 202057900 | U | 11/2011 |
| CN | 102289141 | A | 12/2011 |
| CN | 102300108 | A | 12/2011 |
| JP | 2000284223 | A | 10/2000 |
| JP | 2001222064 | A | 8/2001 |
| JP | 2007065408 | A | 3/2007 |
| JP | 2008064809 | A | 3/2008 |
| WO | 9952269 | | 10/1999 |
| WO | 2005032150 | A1 | 4/2005 |
| WO | 2008042615 | A1 | 4/2008 |
| WO | 2010143891 | A2 | 12/2010 |

OTHER PUBLICATIONS

Fergason et al.; An innovative beamsplitter-based stereoscopic/3D display design, Proceedings of SPIE—The International Society for Optical Engineering; vol. 5664; No. 1; pp. 488-494; Mar. 22, 2005.
Pezzaniti et al.; "Flat Panel 3D Display for Unmanned Ground Vehicles"; Proceedings of SPIE—The International Society for Optical Engineering; vol. 7332; pp. 73320N, 2009.
U.S. Appl. No. 13/357,719; Non Final Office Action; filed Jan. 25, 2012; Date Mailed: Jul. 26, 2013; pp. 1-33.
U.S. Appl. No. 13/357,725; Non Final Office Action; filed Jan. 25, 2012; Date Mailed: Jul. 15, 2013; pp. 1-28.
U.S. Appl. No. 13,672,877; Non Final Office Action; filed Nov. 9, 2012; Date Mailed: Oct. 3, 2013; pp. 1-24.
International Application No. PCT/CN2013/070865; International Search Report and Written Opinion dated May 2, 2013, 14 pages.
International Application No. PCT/CN2013/070883; International Search Report and Written Opinion dated May 2, 2013, 12 pages.
International Application No. PCT/CN2013/070831; International Search Report and Written Opinion dated May 9, 2013, 11 pages.
International Application No. PCT/CN2013/070888; International Search Report and Written Opinion dated May 2, 2013, 11 pages.
International Application No. PCT/CN2013/070828; International Search Report and Written Opinion dated Apr. 25, 2013, 13 pages.
U.S. Appl. No. 13/357,737; Notice of Allowance; filed Jan. 25, 2012; Date Mailed: Jan. 13, 2014; pp. 1-17.
U.S. Appl. No. 13/357,725; Notice of Allowance; filed Jan. 25, 2012; Date Mailed: Jan. 17, 2014; pp. 1-16.
U.S. Appl. No. 13/357,719; Final Office Action; filed Jan. 25, 2012; Date Mailed: Jan. 27, 2014; pp. 1-37.
U.S. Appl. No. 13/673,462; Non-Final Office Action; filed Nov. 9, 2012; Date Mailed: Jan. 30, 2014; pp. 1-53.
U.S. Appl. No. 13,357,707; Non Final Office Action; filed Jan. 25, 2012; Date Mailed: Feb. 4, 2014; pp. 1-56.
U.S. Appl. No. 13,651,715; Non Final Office Action; filed Oct. 15, 2012; Date Mailed: Feb. 5, 2014; pp. 1-52.
U.S. Appl. No. 13/357,715; Non Final Office Action; filed Jan. 25, 2012; Date Mailed: Feb. 26, 2014; pp. 1-40.
U.S. Appl. No. 13/651,780; Notice of Allowance; filed Oct. 15, 2012; Date Mailed: Feb. 28, 2014, pp. 1-14.
U.S. Appl. No. 13,672,980; Non Final Office Action; filed Nov. 9, 2012; Date Mailed: Nov. 8, 2013; pp. 1-41.
U.S. Appl. No. 13,672,947; Non Final Office Action; filed Nov. 9, 2012; Date Mailed: Nov. 26, 2013; pp. 1-40.
U.S. Appl. No. 13/673,112; Non Final Office Action; filed Nov. 9, 2012; Date Mailed: Dec. 13, 2013; pp. 1-42.
U.S. Appl. No. 13/357,725; Notice of Allowance; filed Jan. 25, 2012; Date Mailed: Nov. 20, 2013; pp. 1-33.
U.S. Appl. No. 13/357,737; Notice of Allowance; filed Jan. 25, 2012; Date Mailed: Nov. 22, 2013; pp. 1-56.
U.S. Appl. No. 13/651,780; Notice of Allowance; filed Oct. 15, 2012; Date Mailed: Dec. 23, 2013 pp. 1-21.
U.S. Appl. No. 13/672,877; Final Office Action; filed Nov. 9, 2012; Date Mailed: Mar. 26, 2014; pp. 1-18.

(56) References Cited

OTHER PUBLICATIONS

International Search Report for International Application No. PCT/CN2013/076777; Date Mailed: Mar. 13, 2014, 11 pages.

U.S. Appl. No. 13,357,767; Non Final Office Action; filed Jan. 25, 2012; Date Mailed: Mar. 10, 2014; pp. 1-37.

U.S. Appl. No. 14/062,920; Non Final Office Action; filed Oct. 25, 2013; Date Mailed: Mar. 10, 2014; pp. 1-33.

U.S. Appl. No. 13/357,725; Non-Final Office Action; filed Jan. 25, 2012; Mailing Date: Mar. 21, 2014; pp. 1-14.

U.S. Appl. No. 13/672,980; Notice of Allowance; filed Nov. 9, 2012; Date Mailed: Mar. 26, 2014; pp. 1-17.

U.S. Appl. No. 13/673,112; Notice of Allowance; filed Nov. 9, 2012; Date Mailed: Apr. 30, 2014; pp. 1-24.

U.S. Appl. No. 13/672,947; Notice of Allownce; filed Nov. 9, 2012; Date Mailed: Apr. 30, 2014; pp. 1-23.

U.S. Appl. No. 13/357,707; Final Office Action; Date Filed: Jan. 25, 2012; Date Mailed: Jun. 12, 2014; pp. 1-22.

U.S. Appl. No. 13/357,719; Final Office Action; Date Filed: Jan. 25, 2012; Date Mailed: Jun. 19, 2014; pp. 1-44.

U.S. Appl. No. 13/672,877; Notice of Allowance; Date Filed: Nov. 9, 2012; Date Mailed: Jun. 25, 2014, pp. 1-11.

U.S. Appl. No. 13/673,462; Final Office Action; Date Filed: Nov. 9, 2012; Date Mailed: Jun. 20, 2014; 19 pages.

U.S. Appl. No. 14/051,477; Non-Final Office Action; Date Filed: Oct. 11, 2013; Date Mailed Jun. 20, 2014; 31 pages.

* cited by examiner

THREE DIMENSIONAL IMAGE PROJECTOR WITH TWO COLOR IMAGING

BACKGROUND

The present invention relates to a stereoscopic three dimensional image projector, and more specifically, to a small three dimensional projector usable with passive glasses.

Three dimensional (3D) movies and pictures have become a popular form of entertainment due to the increased realism of the images. 3D images utilize the human physical trait of binocular vision. Human eyes are spaced about 2 inches (5 centimeters) apart, therefore each eye sees the world from a slightly different perspective. The brain receives both images and has a binocular vision function that correlate the difference between what each eye sees to determine distance. The determination of the distance provides the three-dimensional effect that a person sees.

To create a binocular image on a two dimensional surface, such as a movie or television screen, the user typically wears glasses. The glasses alter the way that the user views the images to create the simulated 3D effect. Typically there are two types of glasses, passive glasses and active glasses. The type of glasses used will depend on the type of image projection system being used.

Passive glasses rely upon an optical effect created by using different lenses for each eye. The projection system emits a sequential series of images where subsequent images are slightly offset. The images are arranged such that the user sees the first image through a first lens of the glasses (e.g. the right eye) and the second image is seen with the other lens (e.g. the left eye). Since the images are projected quickly, the user does not notice the multiple images, but rather sees a three dimensional effect. Originally, passive glasses used different color lenses to filter out images, however this limited the use of 3D images when full color images are desired. To alleviate this issue, polarized lenses were developed where each lens of the glasses allowed the transmission of different polarized light. The polarized passive lenses allowed for full color 3D images to be transmitted. Passive lenses are more common with projector type systems, such as movie theaters for example, where multiple projectors may be used to project the images on a screen.

The development of 3D television systems created a new challenge as there typically isn't enough room for multiple projectors. To accommodate this, active lenses were created. With an active lens, the glasses wirelessly communicate with the projector to synchronize the glasses operation with the images being displayed. With active glasses, the lenses are typically liquid crystal displays that can switch between transmitting light and blocking light. In this way, the glasses may rapidly switch the left and right lenses between clear and opaque. While the glasses are switching, the television is projecting a series of sequential images. When this switching is synchronized between the television and the glasses, the user experiences a three dimensional effect.

Accordingly, while existing three dimensional projectors are suitable for their intended purpose a need for improvement remains, particularly in providing a system with a single projector that can project images viewable with passive glasses.

SUMMARY

According to an embodiment of the present invention, a system that includes a first light source emitting a light of a first color and a second light source emitting a light of a second color is provided. At least one PBS is disposed adjacent the first and second light source, and at least one imaging device is disposed adjacent the at least one PBS.

According to another embodiment of the present invention, a projector system for a portable electronic device is provided having a first light source emitting light of a first color and a second light source emitting light of a second color. The second color differs from the first color and a combination of the light from the first light source and the second light source creates a white light. At least one PBS is positioned adjacent to the first light source and the second light source. At least one imaging device is disposed adjacent the at least one PBS.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Contemporary three-dimensional (3D) image projectors that use passive glasses typically use two projectors. Previous efforts to use only a single projector rely upon an active lens within the projector that switches between the sequential images. It should be appreciated that substantial costs may be involved in using redundant projectors or having a costly active lens. Further, these techniques do not scale well as users desire comparable performance from smaller and smaller projector packages.

A second type of projector uses active glasses having a liquid crystal diode (LCD) lens that coordinates with the projector (typically a television). The active glasses alternately block one of the lenses such that the user will see sequential images through alternating lenses. While active glasses perform well to create the 3D effect for the user, they also have some less desirable characteristics. The active glasses require an energy source such as a battery that needs to be periodically recharged or replaced. If the communication between the television and the glasses is interrupted, the 3D effect may be lost. Further, due to the complexity of the system, the active glasses tend to be much more costly.

Figure 1:
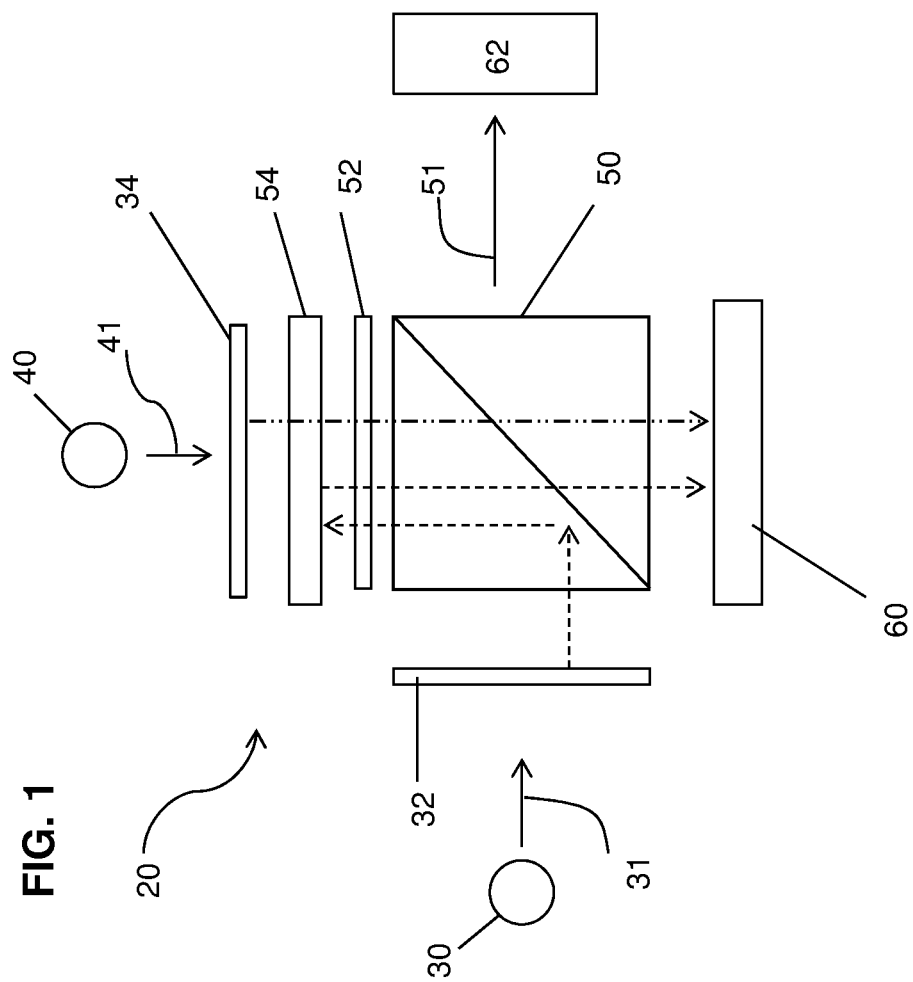
FIG. 1 is a schematic view of a three-dimensional image projector in accordance with an embodiment of the invention.

With reference to FIG. 1, a three dimensional projector 20 is shown for projecting a three dimensional (3D) image from a single projection lens in accordance with an embodiment of the invention. The projector 20 includes a first light source 30 arranged to direct light in a first direction, indicated by arrow 31, and a second light source 40 arranged to direct light in a second direction, indicated by arrow 41. In an exemplary embodiment of the invention, the direction of the first light source and the direction of the second light source are substantially perpendicular to each other. Each light source may include a plurality of unpolarized light emitting diodes (LED). A conventional light source typically comprises red, green, and blue LEDs and emits a light combining all three colors. In one embodiment of the present invention, the first light source emits a first color light and the second light source emits a second color light such that the combination or overlap of light from the first and second light sources creates a white light. The plurality of LEDs in the first and second light sources 30, 40 may be either uniform in color or varying in color so as to create a single emitted color. For example, the LEDs of the first light source may all be green, and therefore the light emitted by the first light source 30 will be green. The LEDs of the second light source 40 may alternate red and blue such that the second light source emits a magenta color. This results in a desired color combination because green and magenta combine to create white light.

The unpolarized first light of a first color emitted from the first light source 30 passes through a linear polarizer 32 that changes the polarization of the light to have a desired polarization characteristic suitable for the imaging device being used. In an alternate embodiment, the plurality of LEDs within either the first or second light source 30, 40 may be polarized such that a linear polarizer is not necessary to the invention. After passing through the linear polarizer 32, the first light enters a polarizing beam splitter 50 (PBS). A PBS is an optical component that splits incident light rays into a first (transmitted) polarization component and a second (reflected) polarization component. The linear polarizer 32 polarizes the light emitted from the first light source such that the light will reflect from the PBS 50 in the direction of the second light source 40. Before reaching the second light source 40, the first light passes through a polarization flipping element 52, which creates a wavelength phase shift between two perpendicular polarization components of the light wave. In other words, the polarization flipping element 52 alters the axis of polarization of the light wave. In an exemplary embodiment, the polarization flipping element may be a quarter wave plate. The first light then reflects off a dichroic mirror 54, reversing direction back along its original path, thereby passing through polarization flipping element 52 once again. Since the light has now passed through the polarization flipping element 52 a second time, the polarization of the first light is once again changed and is now orthogonal to the light originally emitted from the first light source 30. The polarization of the first light is such passes through the PBS 50 when travelling toward the imaging device 60. The first light, once reflected off of the imaging device 60, is unable to pass through the PBS 50 and is diverted towards the projector optics 62, as indicated by arrow 51, to project a first image of a first color.

The unpolarized light from the second light source 40 having a second color, similarly travels through a linear polarizer 34 which polarizes the light such that it is orthogonal to light emitted from the first light source 30. Because of its polarization, the second light then passes through dichroic mirror 54 and across polarization flipping element 52 which shifts the polarization of the light such that the light can transmit through the PBS 50 and onto the imaging device 60. The second light is subsequently reflected from the imaging device 60 back to the PBS 50 where the light is then diverted outward along the same projection axis as the light from the first light source 30 to project a second image of a second color. Alternating emissions from the first and second light source, synchronized with the image content of the imaging device 60, creates sequential left eye and right eye projections with alternate polarizations in the first and second color of the first and second light sources.

In the exemplary embodiment, the imaging device 60 is a liquid crystal on silicon (LCoS) type device that has an imaging surface adjacent the PBS 50. The use of an LCoS image device provides advantages in that the LCoS device inherently polarizes the reflected light.

Figure 2:
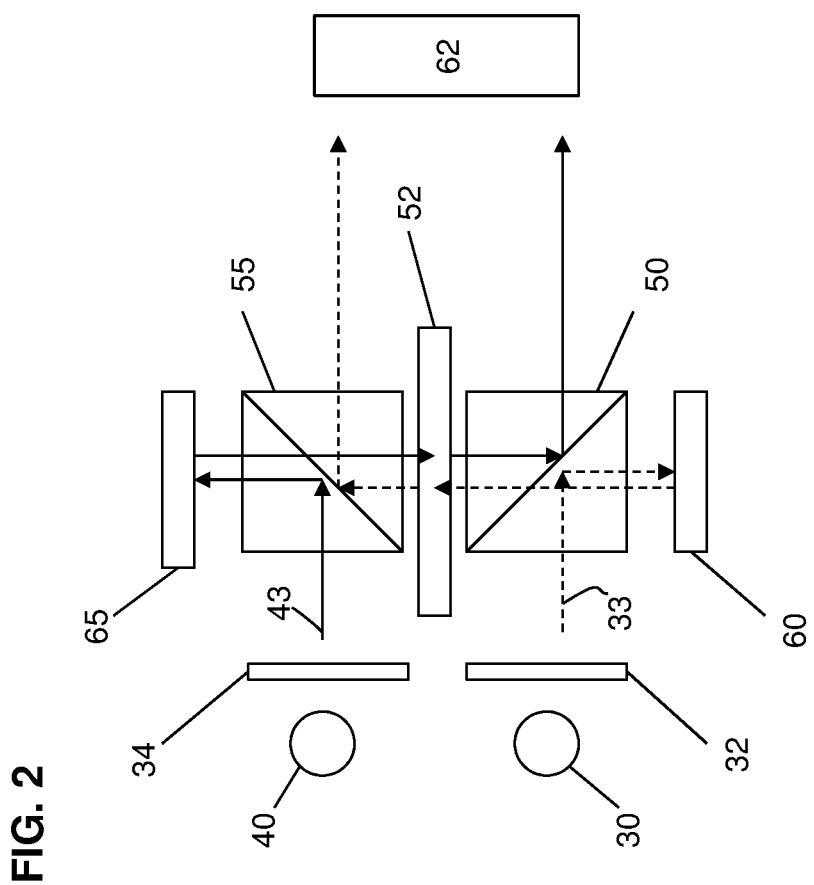
FIG. 2 is a schematic view of a three-dimensional image projector in accordance with another embodiment of the invention.

In another embodiment represented by FIG. 2, the projector comprises a first light source 30 and a second light source 40 both of which are arranged to direct light in substantially parallel directions as indicated by arrows 33, 43. In one embodiment, both the first and second light sources may be arranged to direct their respective lights in a first direction. Unpolarized light from a first light source 30 passes through a first linear polarizer 32 and into a first PBS 50 such that the first light is reflected towards a first imaging device 60. The first light illuminates the first imaging device 60 and reflects back through the first PBS 50 to a polarization flipping element 52. In this embodiment, the polarization flipping element 52 may be a half wave plate. The first light passes through polarization flipping element 52, which shifts the polarization of the light, causing the first light to then travel into the second PBS 55 and reflect outwards towards the projector optics 62. In one exemplary embodiment, the projector is symmetrical across a polarization flipping element 52 such that the unpolarized light from the second light source 40 travels a path symmetrical to the light from the first light source 30. The unpolarized second light from second light source 40 becomes polarized when it passes through a second polarization device 34 such that it reflects from a second PBS 55 towards a second imaging device 65. The second light illuminates second imaging device 65 and reflects back through the second PBS 55 to polarization flipping element 52. Polarization flipping element 52, alters the polarization of the light, such that when the light passes into the first PBS 50, it is similarly reflected outwards towards the projection optics 62. The imaging devices 60, 65 may comprise either an LCoS or alternately, a combination of a polarization flipping element and a mirror such that the polarization of the light is altered and reflected back through the adjacent PBS.

In one embodiment, the projection optics 62 may be a single integrated lens assembly that receives and projects light received from both light sources 30, 40. In another embodiment, the projection optics 62 may include two discrete lens assemblies that are each arranged to receive light from one of the light sources and project it onto a common image surface.

Figure 3:
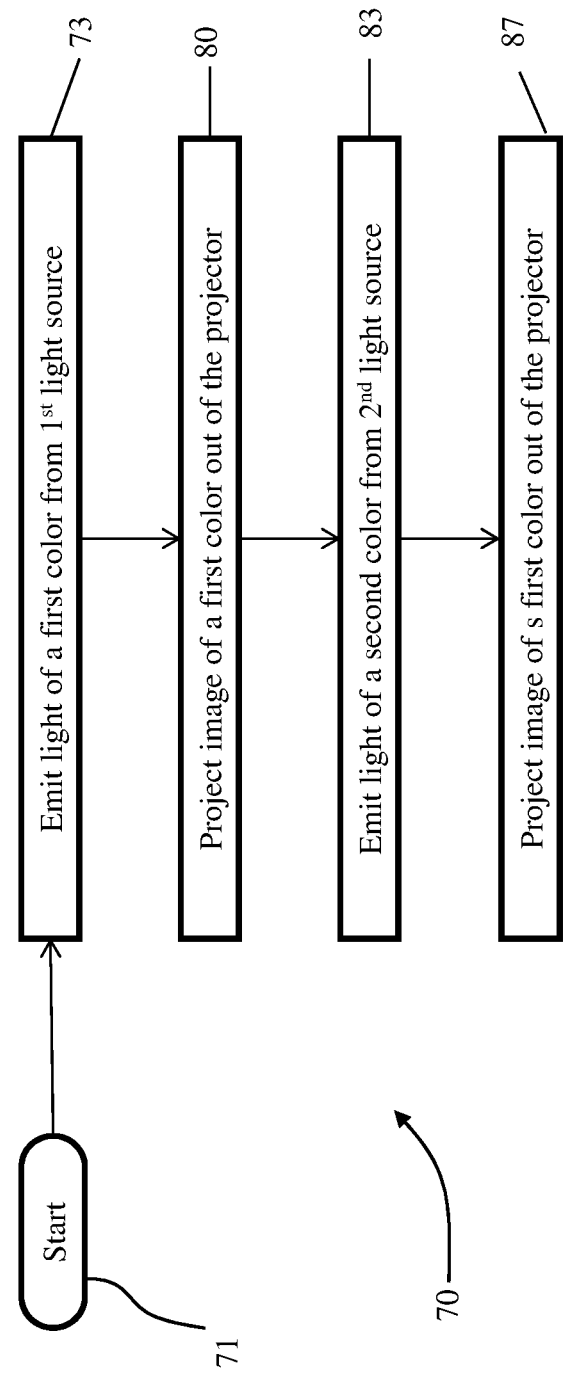
FIG. 3 is a flow chart describing the method of operating a three-dimensional image projector in accordance with an embodiment of the invention.

Referring now to FIG. 3, a method 70 is shown for operating a three dimensional image projector, such as projector 20 for example. In block 73, a first light source 30 emits a first light of a first color. This light travels through the components inside the projector such that an image of that first color is projected from the projector, as shown in block 80. A light of a second color is emitted from the second light source 40 in block 83. In block 87, this light travels through the components inside the projector such that an image of the second color is projected. By sequentially flashing images of a first and second color, it is possible to generate full color images with stereoscopic 3D.

Figure 4:
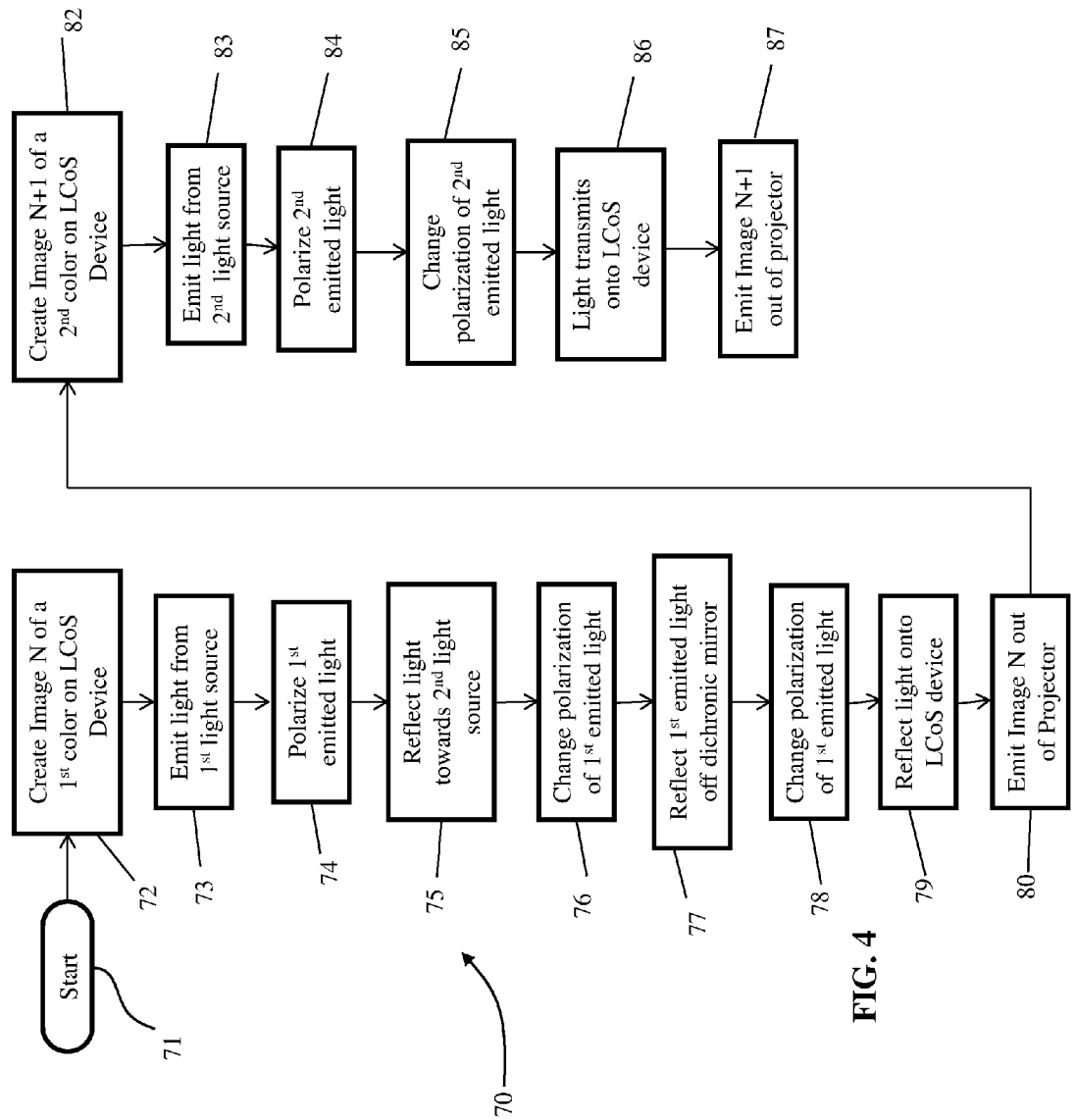
FIG. 4 is another flow chart for a method of operating a three-dimensional image projector in accordance with an embodiment of the invention.

Referring to FIG. 4, another embodiment of a method of operating a 3D projector is shown. A first light of a first color is emitted from a first light source, such as light source 30. As shown in block 74, a specific polarization is applied to this first light causing it to reflect from a device such as PBS 50 in the direction of a second light source. In blocks 76-78, the polarization of the first light changes twice before it is reflected back to PBS 50. The light from the first light source 30 then passes through PBS 50, as shown in block 79, onto an imaging device, such as LCoS imaging device 60 for example. The light is reflected off of the imaging device in block 79 and through one or more lenses of a projection lens assembly 62 to project an image N out of the projector 20 in block 80. Sequentially, a second light source, such as light source 40, emits a light of a second color in block 83. In blocks 84 and 85, the light travels through a polarization device 34, a polarization shifting device 52, and PBS 50 before reflecting onto the imaging device 60. The light reflects off of the imaging device and is projected out of the projector 20 in block 87. The method 70 then loops back to block 72 to continue projecting images from the projector 20. It should be appreciated that images N and N+1 are sequentially projected left and right eye views of alternate polarizations which create a three-dimensional effect for a user wearing polarized passive glasses.

It should be appreciated that use of a first and second light source 30, 40, each of which produces a unique color that combine to create a white light, provides advantages in reducing the size of the projector while retaining the ability to create full color images. Such a projector is suitable for very small packages such as portable electronic devices, including but not limited to a cellular phone, a tablet computer, a laptop computer, and a hand-held gaming device for example. Embodiments provide advantages in emitting a three-dimensional image usable with passive glasses.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
   a first light source emitting a first light of a first color, in a first direction;
   a second light source emitting a second light of a second color, in the first direction, the second light being substantially parallel to and offset from the first light;
   a first beam splitter device (PBS) disposed adjacent to the first light source;
   a second PBS disposed adjacent the second light source;
   a first imaging device disposed adjacent the at least one first PBS;
   a second imaging device disposed adjacent the second PBS;
   a projection lens arranged to receive light from the first PBS and second PBS; and
   a polarization flipping element optically disposed between first PBS and second PBS, wherein the polarization flipping element is positioned to allow the light from the first light source and the light from the second light source to pass through the polarization flipping element prior to the projection lens, wherein the first PBS, second PBS and polarization flipping element cooperate to emit a first output light and a second output light in the first direction into the projection lens, the first output light being substantially parallel to and offset from the second output light.

2. The system according to claim 1 wherein a combination of the first color and the second color creates a white light.

3. The system of claim 1 wherein the first light source is comprised of a plurality of first light emitting diodes (LED) of substantially the same color and the second light source comprises a plurality of second LEDs of varying colors that combine to emit a light of a single color.

4. The system of claim 1 wherein the first light source is comprised of a plurality of first LEDs of varying colors that combine to emit a light of a single color and the second light source comprises a plurality of second LEDs of varying colors that combine to emit a light of a single color.

5. The system according to claim 1 wherein the the first imaging device and the second imaging device are each an LCoS device.

6. A projector for a portable electronic device comprising:
   a first light source emitting a first light of a first color in a first direction;
   a second light source emitting a second light of a second color in the first direction, wherein the second color differs from the first color and a combination of the light from the first light source and the second light source creates a white light, the second light being substantially parallel to and offset from the first light;
   a first beam splitter device (PBS) disposed to directly receive the first light;
   a second PBS disposed to directly receive the second light;
   a first imaging device disposed adjacent the first PBS to receive the first light reflected from the first PBS;
   a second imaging device disposed adjacent the second PBS to receive the second light reflected from the second PBS;
   a projection lens arranged to receive a first output light from the first PBS and receive a second output light from the second PBS, the first output light and second output light being emitted in the first direction, wherein the second output light is parallel to and offset from the first output light; and a polarization flipping element optically disposed between the first PBS and second PBS, wherein the polarization flipping element is positioned to allow the light from the first light source and the light from the second light source to pass through the polarization flipping element prior to the projection lens.

7. The projector of claim 6 wherein the first light source comprises a plurality of first LEDs of substantially the same color, and the second light source comprises a plurality of second LEDs of substantially the same color.

8. The projector of claim 6 wherein the first light source comprises a plurality of first LEDs of substantially the same color, and the second light source comprises a plurality of second LEDs of varying colors that combine to emit a light of a single color.

9. The projector according to claim 6 wherein the first imaging device and second imaging device each comprises an LCoS device.

10. The projector of claim 1 wherein the polarization flipping element is a quarter wave plate.

11. The projector of claim 1 further comprising:
a first polarizer optically disposed between the first light source and the at least one PBS; and
a second polarizer optically disposed between the second light source and the at least one PBS.

12. The projector of claim 1 wherein the first light source and the second light source are configured to sequentially emit light to generate a three dimensional projected image.

13. The system according to claim 1 wherein the first output light is created from the first light and the second output light is created from the second light.

14. The system according to claim 13 wherein the first PBS is positioned to reflect the second output light prior to the projection lens and the second PBS is positioned to reflect the first output light prior to the projection lens.

15. The system according to claim 6 wherein the first output light is created from the first light and the second output light is created from the second light.

16. The system according to claim 15 wherein the first PBS is positioned to reflect the second output light prior to the projection lens and the second PBS is positioned to reflect the first output light prior to the projection lens.

* * * * *